United States Patent [19]

Hall et al.

[11] Patent Number: 4,802,539
[45] Date of Patent: Feb. 7, 1989

[54] POLYCRYSTALLINE DIAMOND BEARING SYSTEM FOR A ROLLER CONE ROCK BIT

[75] Inventors: David R. Hall, Provo, Utah; Donald G. Cross, Laguna Beach, Calif.

[73] Assignee: Smith International, Inc., Irvine, Calif.

[21] Appl. No.: 141,829

[22] Filed: Jan. 11, 1988

Related U.S. Application Data

[60] Division of Ser. No. 864,681, May 19, 1986, Pat. No. 4,738,322, which is a continuation-in-part of Ser. No. 684,849, Dec. 20, 1984, abandoned.

[51] Int. Cl.⁴ ............................................. F21B 10/46
[52] U.S. Cl. .................... 175/329; 175/371; 384/95
[58] Field of Search ............... 175/329, 337, 359, 371, 175/372, 410, 330, 331; 384/95-97, 901; 51/293, 309; 29/148.5 R

[56] References Cited

U.S. PATENT DOCUMENTS

| | | | |
|---|---|---|---|
| 1,649,858 | 11/1927 | Reed | 175/340 |
| 1,710,436 | 4/1929 | Sorensen | 175/347 |
| 1,747,394 | 2/1930 | Scott | 384/95 |
| 1,756,285 | 4/1930 | Decker | 175/369 |
| 1,873,327 | 8/1932 | Reed | 384/96 |
| 1,909,078 | 5/1933 | Scott | 175/228 |
| 1,909,925 | 5/1933 | Abegg | 175/228 |
| 2,061,141 | 11/1936 | Crum | 384/96 |
| 2,592,277 | 4/1952 | Hammer | 175/362 |
| 3,047,344 | 7/1962 | Gros | 384/93 |
| 3,235,316 | 2/1966 | Whanger | 384/95 |
| 3,361,494 | 1/1968 | Galle | 175/371 |
| 3,745,623 | 7/1973 | Wentorf, Jr. et al. | 407/119 |
| 3,866,987 | 2/1975 | Garner | 384/95 |
| 3,998,500 | 12/1976 | Dixon | 384/97 X |
| 4,029,368 | 6/1977 | Tschirky et al. | 384/97 |
| 4,037,300 | 7/1977 | Garner | 29/148.5 R |
| 4,102,419 | 7/1978 | Klima | 175/371 |
| 4,145,094 | 3/1979 | Vezirian | 384/96 |
| 4,176,724 | 12/1979 | Vezirian | 175/369 |
| 4,181,377 | 1/1980 | Oelke | 384/95 |
| 4,190,301 | 2/1980 | Lachonius et al. | 384/95 |
| 4,203,496 | 5/1980 | Baker, III et al. | 175/329 |
| 4,255,165 | 3/1981 | Dennis et al. | 175/329 |
| 4,260,203 | 4/1981 | Garner | 384/96 |
| 4,266,622 | 5/1981 | Vezirian | 175/366 |
| 4,410,054 | 10/1983 | Nagel et al. | 175/107 |
| 4,478,299 | 10/1984 | Dorosz | 175/369 |
| 4,525,178 | 6/1985 | Hall | 51/309 |
| 4,604,106 | 8/1986 | Hall et al. | 51/293 |
| 4,620,601 | 11/1986 | Nagel | 175/107 |

*Primary Examiner*—Thuy M. Bui
*Attorney, Agent, or Firm*—Willian Brinks Olds Hofer Gilson & Lione Ltd.

[57] ABSTRACT

A roller cone rock bit is disclosed with an improved bearing system. The improvement comprises a main journal bearing which is substantially frustoconically shaped and a main roller cone bearing which is reverse shaped to mate with the journal bearing. The journal and roller cone bearings comprise polycrystalline diamond. The invention also includes a member for retaining the roller cone on the journal.

20 Claims, 6 Drawing Sheets

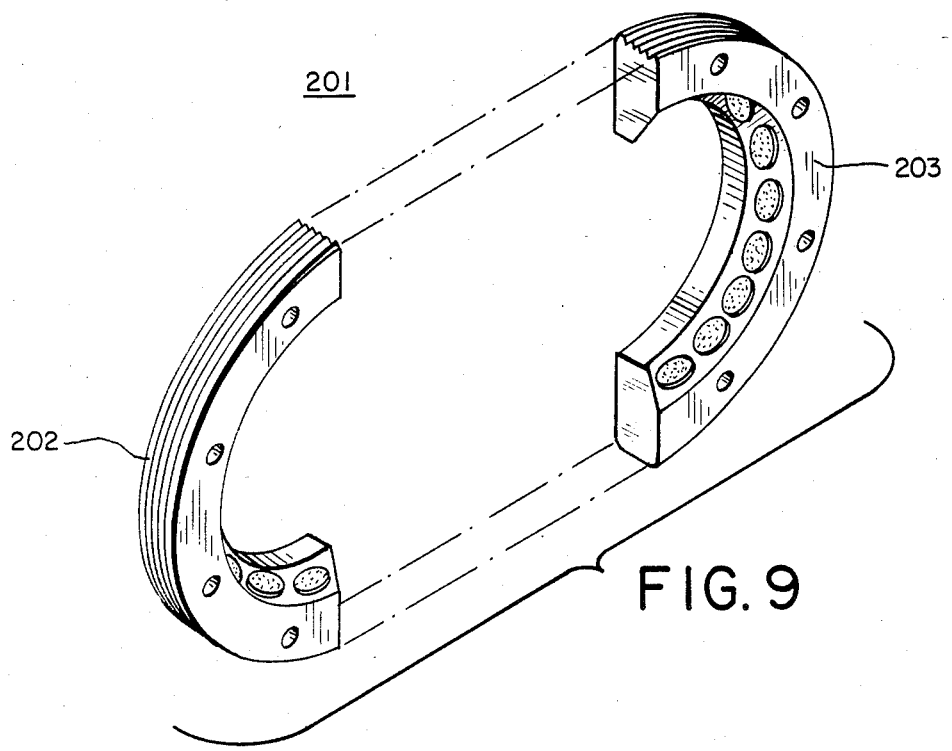
FIG. 9
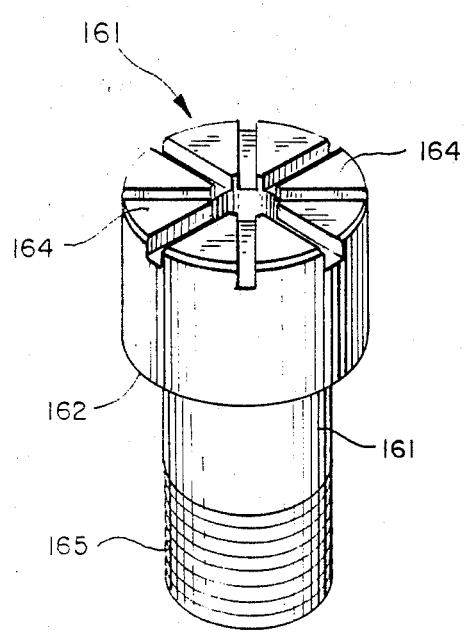
FIG. 10
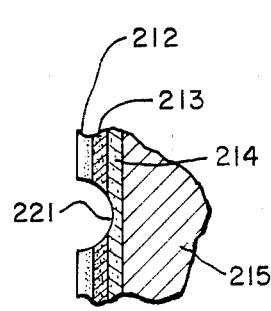
FIG. 13
FIG. 11
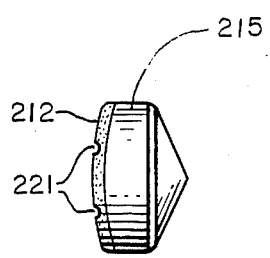
FIG. 12
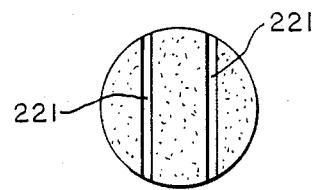
FIG. 12a

POLYCRYSTALLINE DIAMOND BEARING SYSTEM FOR A ROLLER CONE ROCK BIT

CROSS REFERENCE OF RELATED APPLICATIONS

The present application is a divisional application of U.S. patent application Ser. No. 864,681 filed on May 19, 1986 and now issued as U.S. Pat. No. 4,738,322, which parent application was in turn a continuation-in-part application of U.S. patent application Ser. No. 684,849 filed on Dec. 20, 1984 and now abandoned. The entire disclosures of these two parent applications are incorporated herein by reference.

BACKGROUND OF THE INVENTION

The present invention relates generally to the field of earth boring bits and, more particularly, to roller cone rock bits such as those typically used in oil and gas exploration.

Roller cone rock bits generally comprise a main bit body which can be attached to a rotary drill string. The bit body usually includes two or three legs which extend downward. Each leg has a journal extending at a downward and inward angle. A roller cone, with cutters, "teeth", or ridges positioned on its outer surface, is rotatably mounted on each journal. During drilling, the rotation of the drill string produces rotation of each roller cone about its journal thereby causing the cutter elements to engage and disintegrate the rock.

Because of their aggressive cutting action and resultantly faster penetration rates, roller cone rock bits have been widely used for oil, gas, and geothermal drilling operations. However, certain problems exist which limit the useful life and effectiveness of roller cone rock bits. The useful life of a rock bit is an especially critical consideration when viewed in light of the great expense in time and money required to remove and replace the entire drilling string because of bit failure.

The bearings employed between the cones and the journals are the source of significant problems. These bearings operate in an extremely hostile environment due to high and uneven loads, elevated temperatures and pressures, and the presence of abrasive grit both in the hole cuttings and the drilling fluid. This is particularly true when drilling deep holes. In addition, some rock bits such as those used in geothermal exploration are subject to corrosive chemical environments. Another factor which can lead to early bearing failure is the inability of the bearings to withstand changes in the moment of forces directed against the roller cone. As the inserts on the gage row, i.e. the row which engages the sides of the hole, gradually wear down, the sides of the hole become less defined. As a result, the forces from the side of the hole increase. These increased side forces tend to push the cone off its original axis of rotation, thereby "pinching" the bearings in their races and contributing to early bearing failure.

It has been observed that these extreme conditions often cause failure of the roller cone bearings before any other part of the bit, even before the cone's cutters. In addition, as the bearings wear, they can allow for more "wobble" of the cones. As a result, a roller cone bit with worn bearings does not track as well in the hole and has a reduced penetration rate. Also, these limits on the bearing's capacity in turn limit both the load which can be applied to the bit as well as the angular velocity at which the bit can be rotated, thereby establishing constraints on achievable penetration rates and feasible cutter designs.

In some of the earlier roller cone bit designs, the bearing structure was relatively simple. For example, U.S. Pat. Nos. 1,649,858 and 1,909,078 both show a roller cone rock bit with a frusto-conically shaped friction type bushing located between the journal and the cone. Such bearings had a relatively short life expectancy, but so did the other components of the early bits. However, as harder and longer lasting materials such as cemented tungsten carbide began to be used for some of the other components of the roller cone bits, and as these new bits were used to drill increasingly deeper holes through harder materials, several changes were made to improve the bearing's capacity to handle higher loads for longer periods of time.

At present, typical roller cone rock bits use bearings between the journal and roller cone which consist of combinations of anti-friction and friction bearings. The anti-friction bearings (such as ball or roller bearings) are used to facilitate rotation, absorb radially directed forces, and often to retain the roller cone on the journal. The friction bearings are used as "thrust" bearings where the mating surfaces are disposed perpendicular to the rotational axis of the cone and absorb axially directed forces. The friction bearings are also used as radial bearings where the mating surfaces are disposed parallel to the rotational axis and absorb radially directed forces.

Lubricants and coolants are frequently used to increase the life of bearings. One design uses a grease to lubricate the bearings. In bits using such a lubricant, it is necessary to seal the bearings in order to preserve the grease and keep out the drilling mud and rock cuttings. Most of these bits also incorporate a lubricant reservoir and pressure compensator to allow for lubricant loss as well as the high temperatures the bit may encounter in drilling deep holes. For example, see U.S. Pat. Nos. 3,397,928; 3,476,195; and 4,061,376. Naturally, each of these features adds complexity to the bit design. For example, fabrication usually requiring the cones to first be mounted or "pinned" on the journals on separate legs after which the legs are welded onto a main bit body. In addition, because of the harmful effects of high temperature on the seals and lubricants, the maximum rotational speed at which these sealed bearing bits are operated is often limited.

Attempts to increase bearing life have also been made involving the use of harder, more wear-resistant materials on the bearing surfaces. For example, most bits now employ carburizing, hard facing, or special metal inlays for the bearing surfaces, all of which increase the complexity and cost of fabrication. See, for example, U.S. Pat. No. 4,054,426. In addition, U.S. Pat. No. 4,190,301 teaches the use of a pair of opposing polycrystalline diamond compactss for the "nose" thrust bearing.

Also, U.S. Pat. No. 4,260,203 teaches the use of radial and thrust bearing surfaces consisting of polycrystalline diamond. Although the use of polycrystalline diamond bearing surfaces may be an improvement over the use of other materials, the design of the '203 bit does not account for certain properties inherent in polycrystalline diamond. In particular, it has been observed that polycrystalline diamond, although very strong in compression, is not very strong in tension. Because the '203 design has both radial and axial bearings set perpendicular to each other it will subject the polycrystalline diamond to substantial tensile forces. That is, as the thrust bearings are put in compression, the radial bearings are put in tension. Also, the patent does not disclose a method of retaining the cone on the journal other than the conventional method with ball bearings which appears to leave a weak point in the bearing system.

U.S. Pat. No. 4,145,094 shows a somewhat simplified bearing system for roller cone rock bits which does not use ball bearings to retain the cone on the journal. In that design, the cone is retained on the journal by electron beam welding an annular thrust member onto the journal after it has been inserted into the cone, thereby "plugging" the cone onto the journal.

SUMMARY OF THE INVENTION

In general, the present invention is an improved bearing system for roller cones on roller cone rock bits. More particularly, the invention comprises a roller cone rock bit with a frusto-conically shaped bearing surface on the journal which mates with a reverse shaped bearing surface on the roller cone. At least a portion of each of the frusto-conical bearing surfaces comprise polycrystalline diamond (PCD).

In accordance with one preferred embodiment, each journal has a proximate portion adjacent to the leg of the bit and a distal portion extending away from the leg. Rotatably mounted on each journal is a roller cone. There is formed a frusto-conically shaped main journal bearing surface comprising PCD on the distal portion of each journal and each roller cone has a main roller cone bearing surface which also comprises PCD and is adapted to mate with the main journal bearing surface on the journal. There is also a second bearing surface comprising PCD formed on the journal. This second bearing surface is a cone retention bearing surface which is formed on the proximate portion of each journal and is preferably also frusto-conically shaped and arranged such that the diameter of this second bearing surface becomes smaller moving toward the leg. In addition, a retention means for retaining the roller cone on each journal is provided. This means is attached to the cone, preferably by threading, and has a bearing surface comprising PCD and adapted to mate with the cone retention bearing surface on the journal.

In accordance with another preferred embodiment, the drill bit includes a means for preloading and maintaining compression between these two bearing surfaces. In the preferred form of this embodiment, the compression means comprises an elongate pin which is attached at one end to the cone, extends through the center of the journal, and has an enlarged feature at the other end with a thrust bearing surface contacting a thrust bearing surface on the leg of the bit. In simplest form, this pin is a bolt which is threadably attached in the cone, the bolt rotates within the journal, and there is a pair of thrust washer type bearings between the head of the bolt and an outside surface of the leg. Preferably, the thrust washers have a bearing surface comprising PCD.

Each of these preferred embodiment also includes means for passing a stream of the drilling fluid over the bearing surfaces. This results in beneficial cooling and lubricating of the bearings.

As used in the specification and appended claims, the term "polycrystalline diamond" is intended to refer to the material comprising diamond crystals, which crystals have been pressed at sufficient pressure and temperature to produce a mass of randomly oriented crystals which are substantially directly bonded to adjacent crystals. It is also noted that the phrase "frusto-conically shaped," as used in the specification and appended claims, is intended to refer to the curved side surface of a frustum and not the top or bottom.

BRIEF DESCRIPTION OF THE DRAWINGS

The present invention will be more clearly understood from the following detailed description of the specific embodiments, read in conjunction with the accompanying drawings wherein:

FIG. 9 is a perspective view of a two-piece threaded means for use in alternative embodiments.

FIG. 10 is a perspective view of the bolt used to attach the journal to the leg in the embodiment depicted in FIG. 3.

FIG. 11 is a top view of a polycrystalline diamond bearing insert shaped to fit in either the roller cone or in the retention means of the embodiment depicted in FIG. 3.

FIG. 12 is a top view of a polycrystalline diamond bearing insert shaped to fit in the journal of the embodiment depicted FIG. 3.

FIG. 12a is a front view of the polycrystalline diamond bearing, insert shown in FIG. 12.

FIGS. 13 is a magnified, partial, cross-sectional view showing the bearing surface and transition layer of the polycrystalline diamond bearing insert which is preferred in the present invention.

DETAILED DESCRIPTION

Figure 1:
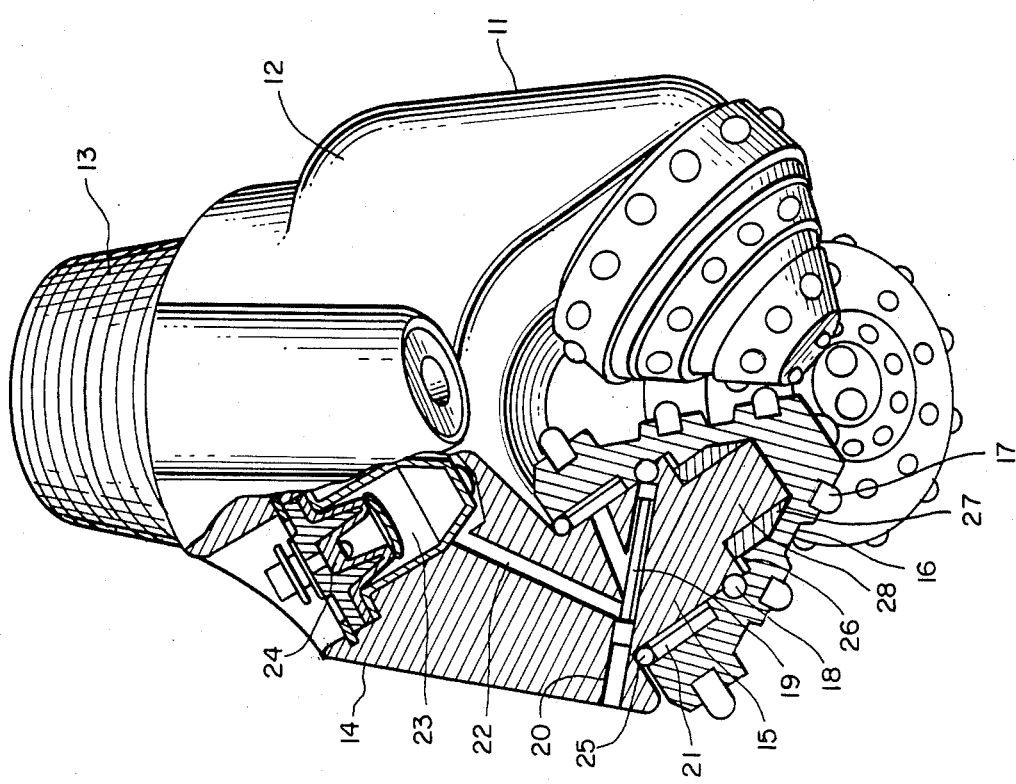
FIG. 1 perspective view and partial cross section of a typical prior art roller cone rock bit.

Referring to the drawings, FIG. 1 is a perspective view of a typical prior art roller cone rock bit 11. The bit is comprised of a main bit body 12 which has an end 13 adapted to be threadably attached to a drill string (not shown). Extending from the main bit body are three legs 14, each of which have a journal 15 formed thereon. A cone 16 which has cutters 17 is rotatively mounted onto each journal 15. The cone is retained on the journal 15 by a set of ball bearings 18 which fill a race cut into the journal and the inside of the cone. In fabrication, the ball bearings are loaded into the race through passage 19. This passage is subsequently sealed by plug 20 and then serves to supply lubricant to the ball bearings 18 and roller bearings 21 as it communicates with passage 22 which in turn communicates with lubricant reservoir 23. A pressure compensator 24 is located with the reservoir 23 to account for higher pressures and temperatures as well as lubricant loss. An elastomeric seal 25 is located between the cone and the journal and serves to keep the lubricant in and the drilling debris out of the bearing system. Thrust bearing 27 serves to absorb and transmit forces directed axially to the one while roller bearings 21 and annular bearing 28 serve the same function with respect to the forces directed radially to the cone.

As mentioned above, typical roller cone rock bits, such as that shown in FIG. 1, are usually fabricated by forming three separate legs each having a journal. A cone is "pinned" onto each journal after which the three legs are welded together to form the roller cone rock bit. This "welded legs" method presents certain problems. First, the process of fabrication is inherently complex and costly. Second, with the welded legs process, it is impossible to repair a bit. In particular, a bit cannot be taken apart and reconditioned with new bearings, cones, etc.

Figure 2:
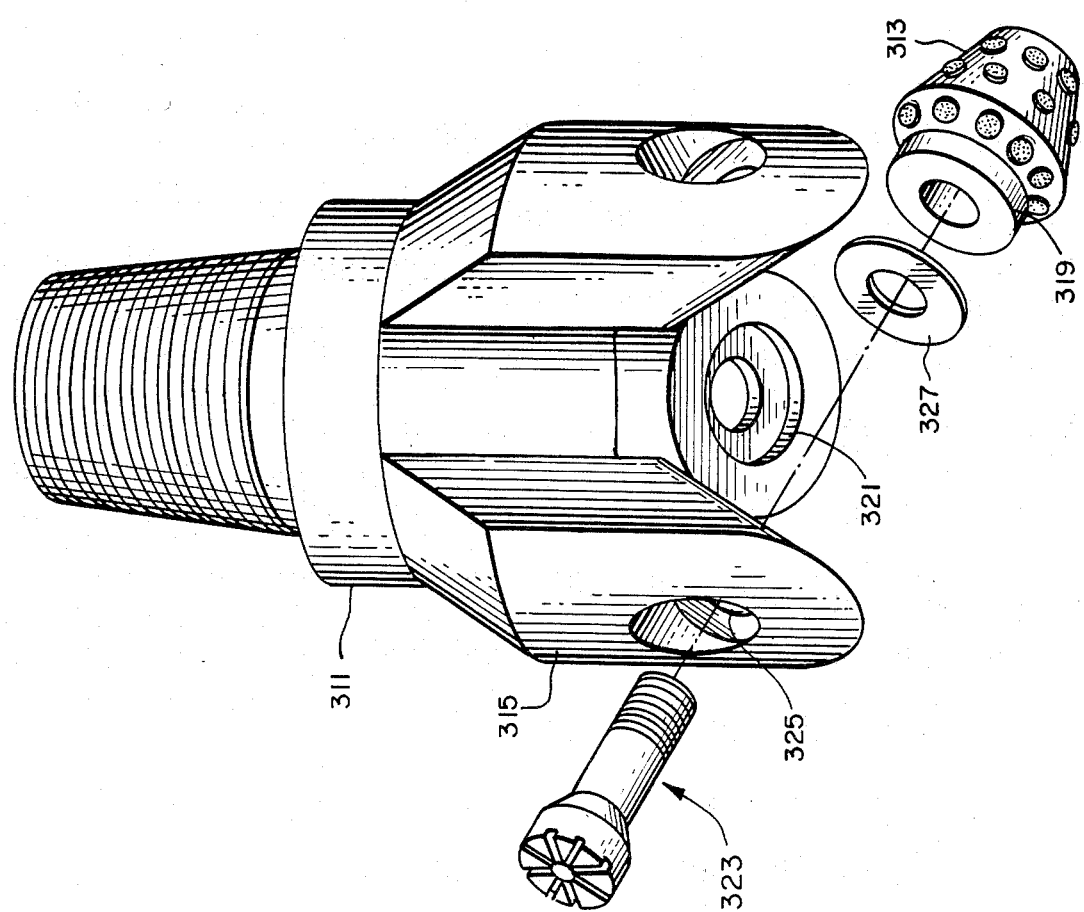
FIG. 2 is a perspective view of the bit body and one frusto-conically shaped journal for use in a preferred embodiment of the roller cone rock bit of the present invention.

FIG. 2 is a perspective view of the bit body 311 showing how one of the three frusto-conically shaped journal 313 is attached to one of the legs 315. In particular, the attaching portion 319 of the journal 313 is inserted into the mating hole 321 in the leg and a bolt 323 is passed through a hole 325 in the leg and threaded into the journal 313. For reasons to be discussed below, it is desirable to use a shim 327 between the journal 313 and the leg 315. Most preferably, the attaching portion 319 is cylindrical and is interference fit into the hole 321. It will be noted that, because the bearing system of the present invention does not require a grease lubricant, the design of the bit body is somewhat simplified.

Figure 3:
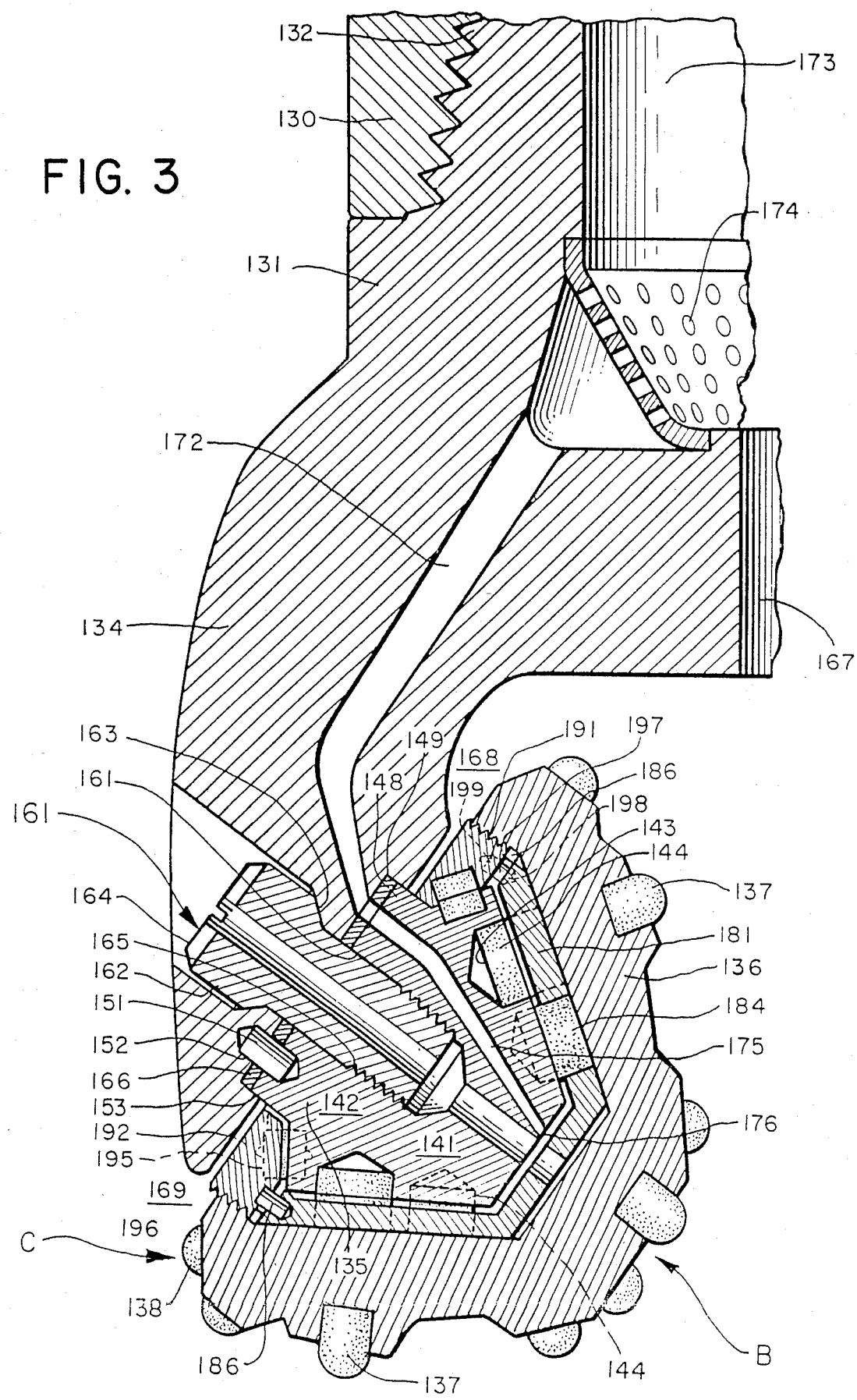
FIG. 3 is a cross-sectional view of another preferred embodiment of the present invention.

FIG. 3 is a partial sectional view of another preferred embodiment of the present invention. The roller cone rock bit of this other preferred embodiment comprises a main bit body 131 which has an end 132 which is adapted to be threadably attached to a drill string 130. A leg 134 extends down from the main bit body. This embodiment also includes two other legs not shown which would be equally spaced around the bit body. Bits have been designed with one, two, three or more legs; such bits are within the scope of this invention. A journal 135 is attached to the leg 134 and extends at a downward and inward angle. A roller cone 136 is rotatably mounted on the journal 135. Cutters 137 are mounted in the roller cone for engaging the bottom of the hole. One advantage of the present invention is that by simplifying the bearing structure, the roller cone may be made thicker, thereby allowing for deeper pockets for the cutters 137. In alternative embodiments the roller cones may have integral teeth or annular ridges for engaging material.

Gage inserts 138 are mounted on the gage row of the cone to engage material on the side of the hole and serve the important function of maintaining a constant diameter of the hole. As this gage row wears, forces from the side of the hole in the direction indicated by arrow C increase and otherwise tend to push the cone off its original axis of rotation.

Figure 4:
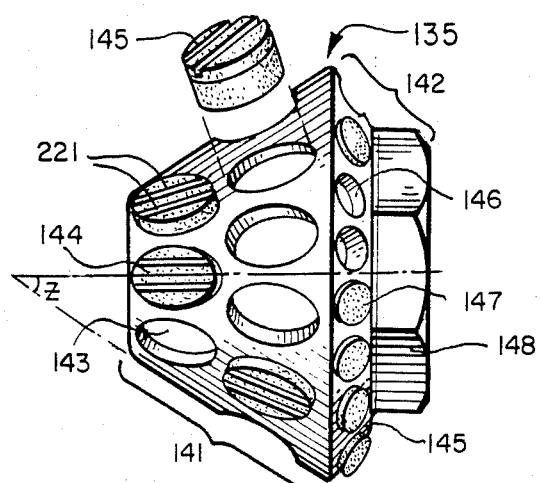
FIG. 4 is a side view of a frusto-conically shaped journal suitable for use in the embodiment of FIG. 3.

Referring also to FIG. 4, the journal 135 which is affixed to the leg 134 comprises a distal portion 141 and a proximate portion 142. The distal portion 141 is frusto-conically shaped. Most preferably, the included angle Z is about 32.5 deg.

The distal portion 141 includes holes 143 which hold polycrystalline diamond bearing inserts 144. The holes 143 are positioned and each of the inserts 144 are shaped so that the bearing surfaces of the inserts lie within a frusto-conical plane, which frusto-conical plane defines the main journal bearing surface of the journal 135. Currently, it is preferred to use two annular rows of inserts, the most distal row having 6 equally spaced inserts, and the other having 8 equally spaced inserts. For reasons to be discussed below, the depth of the holes 143 is preferably selected so that each of the inserts 144 protrude slightly from the surface of the journal 135.

Polycrystalline diamond (PCD) is used as the bearing surface material in the present invention. Although PCD is extremely wear-resistant, it is relatively brittle, i.e. it has relatively low tensile strength. As a result, PCD would not be expected to perform well in the roller cone bit bearing application where such high and uneven impact loads are experienced. However, it was discovered that this problem could be solved by using the PCD bearings in a state of compression. That is, it was discovered that the extremely high compressive strength of PCD could be used to offset its low tensile strength. When the bearings are maintained in a state of compression, the tensile forces are greatly reduced. Therefore, the frusto-conical geometry which allows the polycrystalline diamond to see mostly compressive forces, has allowed the use of polycrystalline diamond in this type of bearing.

In the embodiment which is described below in connection with FIG. 14, the PCD bearing surfaces are pre-compressed by the use of means such as a bolt in order to increase the amount of compressive force on the PCD and thus decrease the amount of tensile force. This design has been shown to allow the PCD to survive the high impact loads exerted on the journal and roller cone bearings.

In addition to the pre-compression, it has been found that the use of a "transition layer" between the PCD and the substrate below has improved the toughness of the PCD bearings. Such a transition layer comprises pieces of precemented carbide interspersed in the PCD transition layer. In this way, the fracture resistance of the PCD bearing inserts have been improved. A U.S. patent application Ser. No. 864,683 has been filed concurrently herewith directed to this improvement. The entire disclosure of this application is incorporated herein by reference. The PCD bearing inserts of the preferred embodiment includes such a transition layer. Details of the transition layer are provided in connection with FIG. 13.

Another reason that one would not naturally think to use polycrystalline diamond as a bearing is that most uses of PCD to date have been for cutting, grinding or abrading operations. That is, it would be thought that PCD is too rough or abrasive to be successful as a bearing. However, it has been found that when two PCD surface are well polished and fit together well, that the coefficient of friction is actually quite low. Values as low as 0.005 have been measured over wide ranges of loads and speeds ranging up to 40,000 lbs. axial compression and 1,000 r.p.m. In fact, most likely due to its high compressive strength, the coefficient of friction remains low over an impressive range of applied loads. This low coefficient of friction at high applied loads is very important in relation to the frusto-conical geometry which is discussed with respect to FIG. 17.

Another advantage which was discovered in using PCD for the bearings of the preferred embodiment is PCD's high thermal conductivity. In particular, it is important for the bearings to be able to dissipate the heat which builds up during use.

Still another advantage of using PCD is its relative inertness. That is, in most bearings which are subjected to high loads at high temperatures, there is a problem of welding of the contacting surfaces. To avoid this problem, many such bearings are made from dissimilar metals, a solution which can introduce new problems related to dissimilar coefficients of thermal expansion etc. In contrast, when PCD is used in the present invention, the fact that diamond is relatively unreactive, obviates these problems.

Referring again to FIGS. 3 and 4, the proximate portion 142 of the journal 135 preferably also includes a frusto-conically shaped surface 145. This surface is oriented so that the diameter of the surface decreases in the direction toward the leg 134. Most preferably, this surface 145 is shaped and oriented so as to be perpendicular to the frusto-conical surface of the distal portion 141. In alternative embodiments, this surface can be planar disc shaped.

Holes 146 are provided to hold inserts 147. The holes 146 are positioned and the inserts 147 are shaped so as to provide a frusto-conically shaped cone retention bearing surface of the journal 135. Currently, it is preferred to use 15 equally spaced inserts in this cone retention bearing. As with the main journal bearing surface, the depth of the holes 147 is also selected so that each of the inserts 147 protrude slightly from the surface 145 of the journal 135.

The proximate portion 142 also includes in attaching portion 148 which is preferably interference fit into a like shaped hole in the leg. Most preferably, to ensure the best interference fit, the attaching portion 148 and the hole in the leg are cylindrical as shown in FIG. 2. In the embodiment shown in FIGS. 3 and 4, the attaching portion is configured so as to index with some feature on the leg 134 to thereby prevent rotation of the journal 135 once attached. In particular, the attaching portion 148 has a hexagonal shape which mates with a hexagonal recess 149 in the leg 134. Also in the depicted embodiment, a plurality of pins 151 are inserted into holes 153 in the journal and holes 152 in the leg to further prevent the journal from rotating. Three such pins 151 are included in the depicted embodiment. In the most preferred embodiment, there are no indexing pins. Instead, in the interest of simplicity and structural integrity, the interference fit and the tension on the bolt 161 are relied upon to maintain the Journal in place.

When using a non-cylindrical attaching portion 148, it is preferable that the shape of the attaching portion 148 and thus the shape of the recess 149 in the leg together with the number of indexing pins is selected so that the journal can be indexed at different points of rotation relative to the leg. In this way, it is possible to extend the life of the main journal bearing because it is the bottom portion of the journal which is subjected to the majority of the load. As a result, the bottom portion would be expected to wear faster. In this depicted embodiment however, it is possible to "rejuvenate" the main journal bearing by separating the journal from the leg, rotating the journal 120 degrees, and reattaching the journal to the leg. The most preferred embodiment which includes a cylindrical attaching portion can likewise be rotated to prolong the life of the journal bearing.

A bolt 161 is used in this embodiment to attach the journal 135 to the leg 134. Further details of this bolt 161 are shown in greater detail in FIG. 10. The bolt 161 includes a head portion 162 which has an underside shaped to fit within a recess 163 in the leg. The top 164 of the head portion 162 is configured with slots to facilitate connection with a tool to tighten the bolt. The threaded portion 165 of the bolt is threaded into the journal 135.

It will be noted that, in the embodiment depicted, the threads do not extend the full length of the bolt 161. This is preferable because it allows the bolt to be tightened to a point wherein it is placed in a relatively degree of tension. Most preferably, the bolt is tightened with about 1300 foot/pounds of torque. In this most preferred embodiment, the bolt is made of Vasco T-200 steel and the torque pre-stresses the bolt to about 85 percent of its yield strength. This is desirable because it allows the bolt to be pre-stressed to a level above the stress it will see during use. As such, cyclic fatigue of the bolt will be reduced.

It is also important to note that, in this most preferred embodiment, the bolt 161 should not experience a bending moment. In particular, because the bolt 161 holds the attaching portion 148 tightly in the receiving hole in the leg, the journal 135 cannot move transversely to the bolt 161 relative to the leg 134. In addition, there is preferably a space between the side of the bolt 161 and the hole through the journal 135, in order to further prevent the bolt from experiencing a bending moment.

Preferably, at least one shim 166 is included between the journal 135 and the leg 134. The shim 166 will have the same shape as the attaching portion 153 of the journal and will also have holes to match the holes for the indexing pins 151, if pins are used. The use of shims is desirable in the preferred embodiment because of the ability it provides to adjust the alignment of the journals. In particular, it is important that, when the bit is manufactured, the cones are positioned and oriented such that when the bit is rotated all of the gage rows will rotate in a single circle, i.e. not in concentric circles. This is typically referred to as gage alignment. In this preferred embodiment, the use of shims allows the bit manufacturer to easily adjust the gage alignment by using thicker or thinner shims to thereby move each journal and thus each cone in or out.

Figure 5:
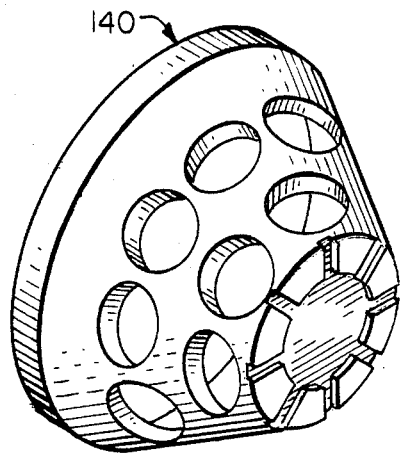
FIG. 5 is a perspective view of the shell used to position the inserts in the main roller cone bearing of the embodiment shown in FIG. 3.
Figure 6:
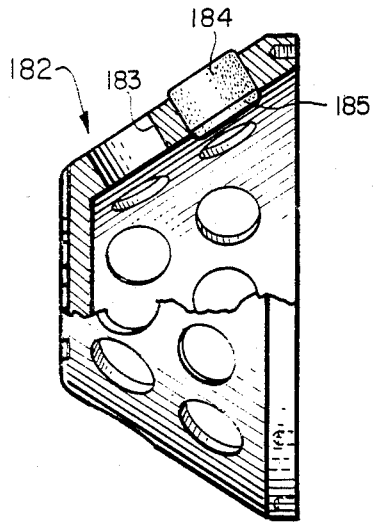
FIG. 6 is a side view in partial cross section showing the shell depicted in FIG. 4.

A roller cone 136 is mounted on the journal 135. The roller cone 136 has a main roller cone bearing 181, See FIGS. 5 and 6, which preferably comprises a shell 182 which has selectively placed holes 183 for receiving polycrystalline diamond inserts 184. The hole 183 are placed and the bearing surfaces 185 of the inserts 184 are shaped so that the bearing surfaces 185 lie in a frusto-conical plane which mates with the frusto-conical main journal bearing surface. The shell 182 is placed in a mating cavity formed in the roller cone to thereby provide the main roller cone bearing. Currently, it is preferred to use two annular rows with 8 equally spaced inserts in the more distal row and 9 equally spaced inserts in the other row. In this preferred embodiment, the holes 183 pass all the way through the shell 182. In this way, the polycrystalline diamond bearing inserts press directly against the inside of the cone which thus helps to maintain the position of the shell 182 within the cone 136. In alternative embodiments, the holes do not pass all the way through. In such embodiments, it may be desirable to provide some form of indexing in order for the shell to retain its position.

In other alternative embodiments, a shell is not used. That is, the inserts are set directly into holes formed in the cavity of the roller cone.

Figure 7:
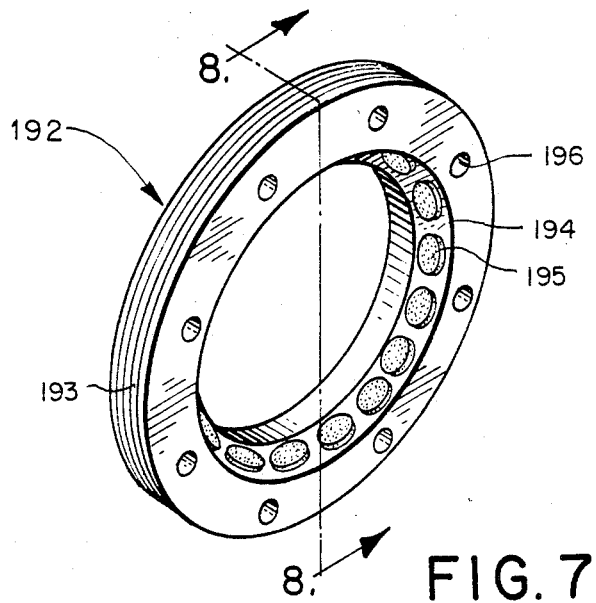
FIG. 7 is a perspective view of the threaded cone retention means used in the embodiment depicted in FIG. 3.
Figure 8:
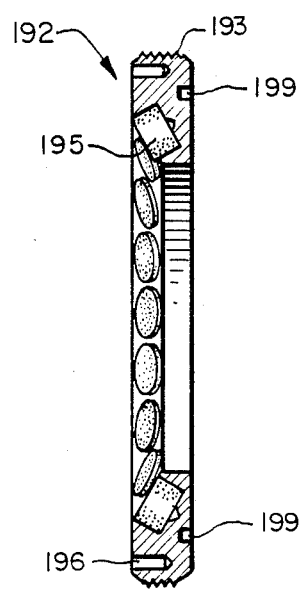
FIG. 8 is a cross-sectional view of the threaded cone retention means taken along line 8—8 in FIG. 7.

The roller cone 136 in this preferred embodiment is configured with threads 191 in its cavity near the leg 134. A roller cone retaining ring 192 is adapted to thread into the cone at this point to thereby retain the cone 136 on the journal 135. Further details of the retaining ring 192 are shown in FIGS. 7 and 8. The ring includes threads 193 formed on its periphery for threading into the cone 136. The ring also includes a frustoconical surface 194 which has a plurality of holes into which polycrystalline diamond inserts 195 are inserted. The holes are placed and the inserts 195 are shaped so that the bearing surfaces of the inserts lie in a frustoconical plane, which plane mates with the frusto-conical cone retaining bearing surface on the proximate portion 142 of the journal 135. Currently, it is preferred to use 16 equally spaced inserts in this retention means bearing.

The ring 192 may also include indexing holes 196 into which indexing pins 197 are inserted to thereby index with holes 198 in the shell 182. In this way, when the ring is rotated into the cone, the shell rotates with it. However, it is preferred to omit the pins for reasons of simplicity, particularly in light of the fact that it should not matter if the shell rotates with the retaining ring.

Preferably, a shim 186 is placed between the ring 192 and the shell 182. By varying the thickness of the shim 186, the tightness, or compression, between the bearings can be adjusted to the desired level. Holes 199 are provided in the ring 192 for attaching a tightening tool thereto. It is currently preferred to tighten the threaded ring to the point at which the cone can be manually rotated about the journal, but at which there is no play between the bearings.

Although, the polycrystalline bearing of the present invention can perform at high loads and rotational speeds without any lubrication, it has been shown to be desirable to lubricate and especially to cool the bearings. It has been found that overheating of the PCD bearing surfaces can lead to early wear as the diamond reverts to graphite above certain temperatures. Such temperatures are well-known in the art.

In the most preferred embodiment, lubrication and cooling are accomplished by simply leaving the bearing system open to the drilling fluid and including a hole 161a through the bolt 161 and a hole 135a through the distal end of the journal 135. It was a surprising result that a drilling fluid such as drilling mud could work well as both a lubricant and coolant for the bearing of the preferred embodiment. Drilling mud typically contains high quantities of abrasive silicate particles. Most bits are designed to keep the mud away from the bearings. With the present invention, when the bearing is comprised of polycrystalline diamond, these silicate particles are actually ground by the polycrystalline diamond surfaces and result in fine particles which may function as a lubricant on the diamond bearing surfaces. Accordingly, the preferred embodiment does not require seals to keep the drilling mud away from the bearings, but rather uses the drilling mud as a lubricant and coolant.

In addition, the most preferred embodiment is designed to encourage flow of the drilling fluid through the bearing system. In particular, because a nozzle 167 for the drilling fluid is located at the center of the bit body, this causes a pressure differential between the central space between the cones and the space outside of them. This pressure differential encourages the drilling fluid to flow into the bearing system at the space 168, which space is between the rotating cone and the leg near the top of the journal 135, through the bearing system and out of the bearing system either through the holes 135a and 161a or through the space 169, which space is near the bottom of the journal 135. Added to this flow encouraged by the pressure differential is the flow which is caused by the rotation of the cone. Preliminary tests have shown that these two factors produce sufficient fluid flow through the bearing system to produce the required level of cooling and lubrication.

In the alternative embodiment shown in FIG. 2, the lubrication and cooling is also aided by the provision of a passage 172 which communicates at one end with a central cavity 173 in the bit body 131 which in turn communicates with a source of drilling fluid in the drill string. A grate or screen 174 is located in the central cavity 173 to prevent large particles from entering the passage 172. The other end of the passage 172 communicates with the hole through the shim 149 which in turn communicates with a passage 175 in the journal 135. In this way, a stream of the drilling fluid can pass over the journal/roller cone bearings and the cone retention bearings. In embodiments wherein the journal can be rotated to different points, there is provided the necessary number of passages 175 in the journal 135.

As mentioned above, it is preferable to select the depth of the holes into which the polycrystalline diamond bearing inserts are placed so that the inserts protrude slightly from those holes. This is done in order for the cooling liquid to be able to pass around each of the inserts. In addition, the protrusion of the inserts prevents the non-bearing surfaces from contacting.

It has been observed that providing the polycrystalline bearing in the form of equally spaced inserts, as opposed to a single continuous surface, has lead to improved cooling. This is because the PCD surfaces are well cooled since they are continually being exposed to the drilling fluid, i.e. when they are not overlapping the opposing PCD surfaces. This has proven highly beneficial especially in light of the fact that, as mentioned, PCD is subject to thermal degradation above a certain temperature. Thus, by using PCD inserts rather than a continuous surface, the PCD bearings are allowed to cool much more efficiently.

It has also been discovered that the cooling can be enhanced even further by providing grooves in the PCD bearing surfaces. As seen in FIG. 12a and 13, the bearing surface of the PCD insert can be subdivided by placing one or more grooves 221 in the bearing surface. In this way, the time between cooling by the drilling fluid is shortened, thus allowing the PCD bearings to run at higher pressures and velocities without undergoing thermal degradation. These grooves can either be put into the PCD surfaces during the formation of the PCD, or they can be cut into the PCD surfaces subsequently. Preferably, the grooves are cut into the PCD surface by a wire Electric Discharge Machine (EDM). It is currently easier to cut the grooves into the convex PCD inserts. Thus, it is preferable to put the grooves into the the PCD bearings used in both of the journal bearing races. The grooves preferably are orieted generally parallel to each other and such that they are substantially convergent with the rotational axis of the cone. Also, they preferably have a U-shaped cross-section and are about 0.030 inches deep and 0.030 inches across at the top.

It will be observed that a space 176 is left between the distal end of the journal 135 and the otherwise adjacent surface of the shell 182. It should also be noted that neither the roller cone 136 nor the retaining ring 192 contact the leg 134. These two features are important because they not only allow for passage of the drilling fluid, but more importantly, they allow the main roller cone bearing 181 to be freely compressed against the main journal bearing. In other words, in the preferred embodiment, the frusto-conically shaped main journal bearing is the only surface on the journal or leg which prevents the roller cone from moving axially in the direction indicated by arrow B.

Figures 15, 16, 17:
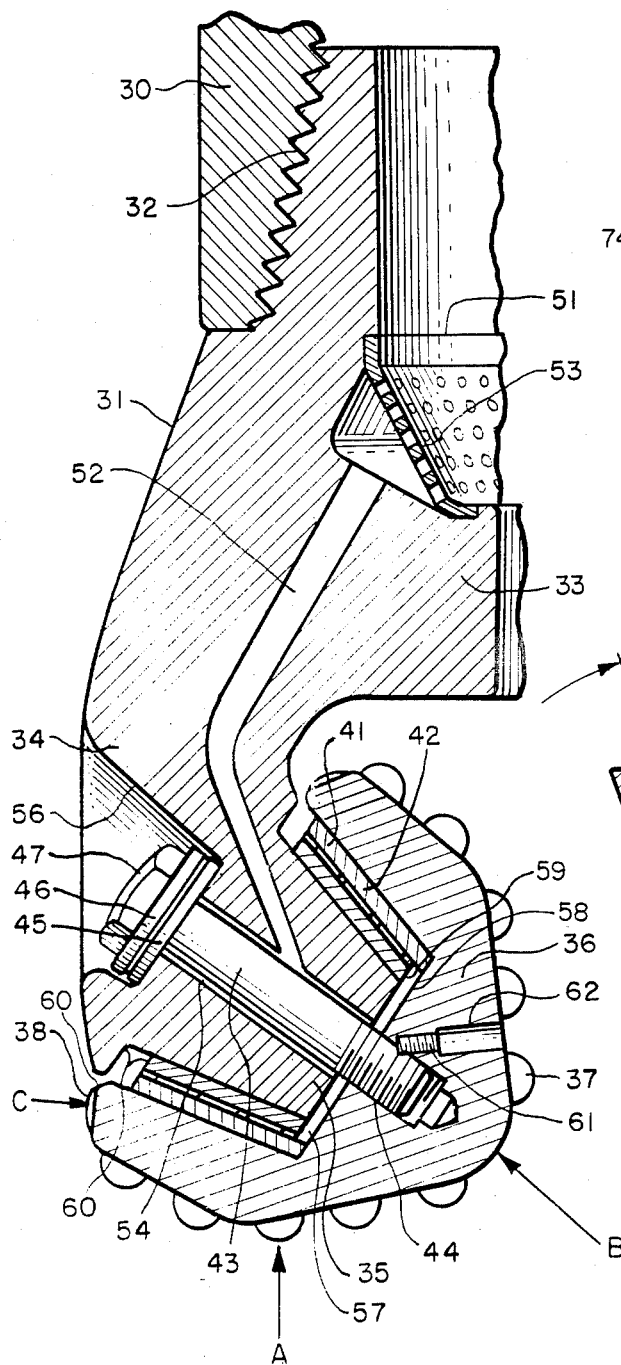
FIG. 15 is a cross-sectional view of another embodiment of the invention wherein the cone is retained on the journal by a bolt passing through the cone and journal and threaded into the leg.
FIG. 16 is a perspective view of a frusto-conically shaped shell with polycrystalline diamond bearing inserts inserted therein.
FIG. 17 is a schematic diagram showing a sectional view of a pair of frusto-conical bearings with the application and resolution of forces exerted thereon.

General mechanical principles tend to lead those skilled in the art to conclude that the frustoconical geometry would be inappropriate for friction bearings which experience high forces directed axially, especially when as in the present design, there is no "backstop" for the axial loads. A frusto-conical friction bearing with high axial loads would act much like a wedge, in which the force normal to the face of the wedge would exceed the applied downward force. FIG. 17, which is a schematic cross section of a pair of frusto-conical friction bearings, illustrates this point. As the roller cone bearing 82 is pushed onto the journal bearing 81 with the axial force represented by arrow $F_a$, the force to resist that motion is represented by arrow $F_r$. However, because the two bearing surfaces are not attached, the only counteractive force must be normal to the two surfaces and is represented by arrow $F_n$. Because the normal force $F_n$ is at an angle to the force $F_r$, it must be of a greater magnitude than the force $F_r$. As a result, the normal force $F_n$ (the force which determines the frictional force between the two bearings) is magnified.

In trigonometric terms, the applied force $F_a$ and the normal force $F_n$ of the frusto-conical journal bearing 81 against the frusto-conical roller cone bearing 82 are related by the following equations:

$$F_n = F_a / \sin \theta, \quad (1) \text{ and}$$

$$F_f = F_n = F_a / \sin \theta, \quad (2)$$

where $\theta$ is the angle between the outer surface of the bearing and the axis of rotation of the roller cone, is the coefficient of friction of the bearing material, and $F_f$ is the frictional force resisting the rotation of the roller cone bearing 82 on the journal bearing 81. With respect to the forces normal to the surface of the bearing, the applied force $F_a$ is magnified by a factor of $1/\sin \theta$. As $\theta$ approaches 0 (i.e. as the bearing becomes steeper) $1/\sin \theta$ goes to infinity, and the normal force $F_n$ becomes infinitely large. The practical result is that the normal forces in a frusto-conical friction bearing experiencing high axial loads would become so large as to exceed the frictional force $F_f$ and cause the bearing to seize. A surprising result of the present invention is that, even with a high load of compression, no such seizing occurs when polycrystalline diamond is used for the bearing material.

In the method of fabricating the first preferred embodiment, it is necessary to first insert a journal 135 into each cone 136. The ring 192 is then threaded into the cone and tightened. Preferably, a shim is used to achieve the desired tightness between the bearings. Once the ring has been tightened, the journal is mounted on the leg 134 of the bit. The bolt 161 is passed through the outside of the leg and threaded into the journal. The bolt is tightened to the desired torque, as stated above, with the particular bolt used in the most preferred embodiment, the torque is preferably about 1300 ft lbs. which is about 85% of the yield strength of the bolt. As mentioned, it has been observed that putting a relatively high level of torque on the bolt is advantageous in that it prestresses the journal and thus reduces the cyclic fatigue experienced by the journal. A a shim is preferably used between the journal and the leg to thereby accurately adjust the gage alignment.

An important advantage of this first preferred embodiment is that it offers a bit which can be fabricated with relative simplicity. As mentioned above, the fabrication of typical prior art roller cone rock bits involves a complex "pinning" step where the ball bearings are inserted through a hole into a race in order to retain the cone on the journal. In contrast, the roller cones of this embodiment can be attached by simply inserting the journals therein and then bolting the journals onto the bit legs.

Second, in typical prior art fabrication, because of the complexity of the pinning operation and spatial limitations, each leg is usually forged separately. After a cone is pinned on each leg, the legs are welded onto a main bit body. (See U.S. Pat. No. 4,266,622 for a discussion of the problems inherent in this process.) In contrast, because the cones of this embodiment are attached to the journals first, the bit body can be made in one piece.

A further advantage gained by this simplification of the fabrication process is that it will make reconditioning of worn out bits possible. At present, the standard practice in the drilling industry is to discard the entire bit when any part of it fails since the cones or bearings cannot be replaced with the welded legs approach. With the present invention, it is possible to replace the cones without destroying and refabricating the whole bit. Therefore, it will be economical to use each of the parts of the bit to its fullest extent. Indeed, preliminary tests show that it will be the bearings that have the longest life expectancy. Thus, the bearings can be removed when the bit body and cutters are worn out and put into a new bit.

An advantage which also stems from this simplification of the bit fabrications is that it may now be possible to service roller cone bits in the field. That is, because the cones may be removed and attached in a relatively simple operation and with standard tools, it may be possible to change cones at the drilling site. In addition to replacing worn out cones, it will also be possible for a driller to maintain an inventory of cones with different types of cutters and thereby be better able to tune the cutting characteristics of the bit in response to the formation in which he is drilling. Under present technology, the driller is required to maintain a costly inventory of entire bits to accomplish the same result.

FIG. 9 shows a retaining ring 201 which is made in two halves 202 and 203. Such a "split ring" can be used in an alternative embodiment to that shown in FIG. 2. In this alternative embodiment, the journal can be made in one piece with the leg. The cone is placed over the journal and then the two halves of the retaining ring 201 are put together around the base of the journal and then threaded into the cone as in the embodiment shown in FIG. 2. Such an embodiment may be desirable in order to further simplify the fabrication process.

FIG. 11 shows a top side view of a concave polycrystalline diamond insert which can be used in either the main roller cone bearing or in the bearing of the cone retaining means. FIG. 12 shows a top side view of a convex polycrystalline diamond insert which can be used in either of the bearings on the journal.

As seen in FIG. 13, each of these inserts includes a layer 212 of polycrystalline diamond, at least one transition layer 213 of polycrystalline diamond with pieces of precemented carbide interspersed therein, and a substrate 215 of cemented carbide. Most preferably, a second transition layer 214 is also included which has a higher precemented carbide content than the first. The polycrystalline diamond layer and the transition layer used in the most preferred embodiment are made according to the teaching of U.S. Pat. No. 4,604,106 (Ser. No. 06/728,177), the entire disclosure of which is incorporated herein by reference. In particular, the PCD bearing surface layer 212 most preferably comprises about 100% PCD including a minor amount of residual catalyst/binder material and is about 0.015 inches thick. The first transition layer 213 constitutes about 60 percent by volume PCD (including residual catalyst binder) and about 40 percent precemented carbide pieces. This first transition layer 213 is most preferably about 0.010 inches thick. The second transition layer constitutes about 40 percent PCD and about 60 percent thick. As shown, the groove 221 preferably passes through the diamond layer 212 and the first transition layer 213 and just slightly into the second transition layer 214.

Figure 14:
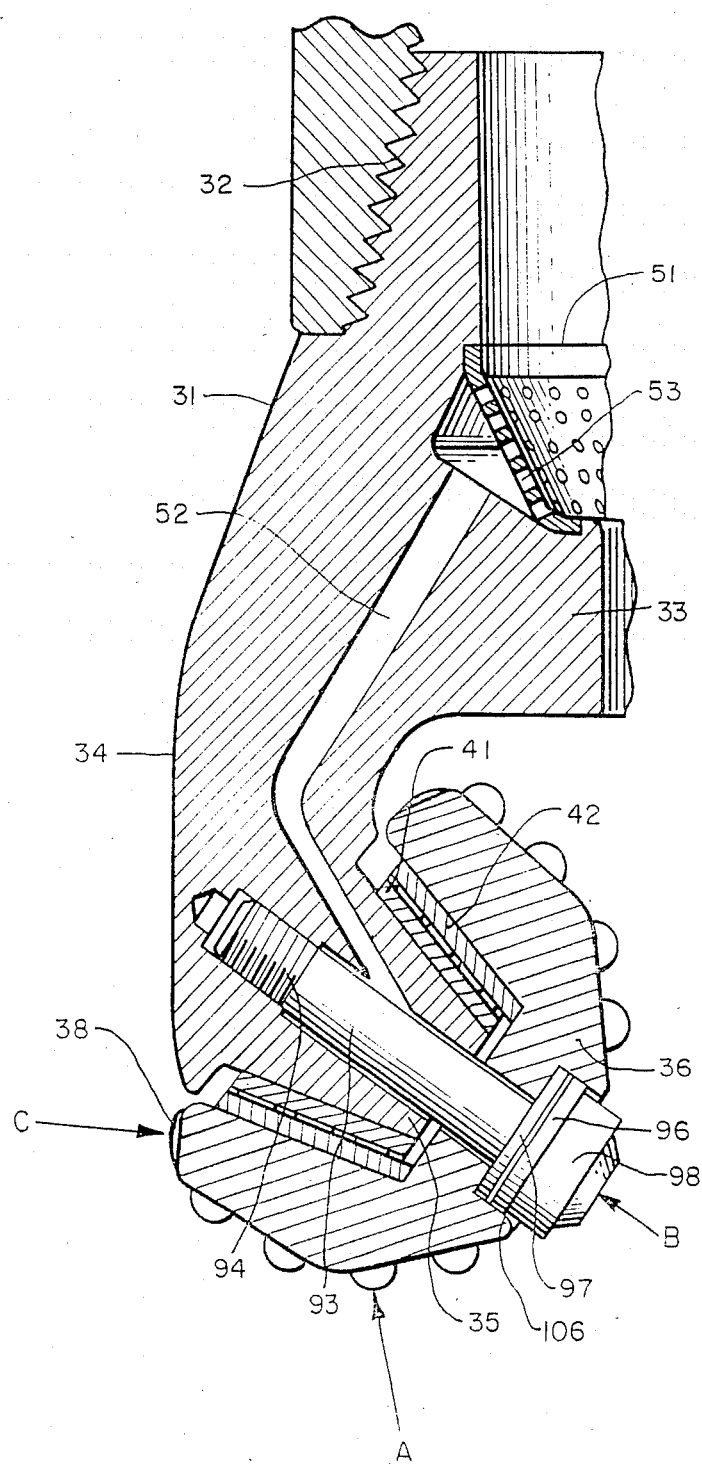
FIG. 14 is a cross-sectional view of yet another preferred embodiment of the present invention wherein the cone is retained on the journal by a bolt passing through the leg and journal and threaded into the cone.

FIG. 14 is a sectional view showing another preferred embodiment of the present invention wherein the cone is retained on the journal by the use of a bolt. The roller cone rock bit of this embodiment likewise comprises a main bit body 31 which has an end 32 which is adapted to be threadably attached to a drill string 30. A leg 34 extends down from the main bit body. This embodiment also includes two other legs not shown which would be equally spaced around the bit body. Bits have been designed with one, two, three or more legs; such bits are within the scope of this invention. A journal 35 is formed on the leg 34 and extends at a downward and inward angle. A roller cone 36 is rotatively mounted on the journal 35. Cutters 37 are mounted in the roller cone for engaging the bottom of the hole. As mentioned, one advantage of the present invention is that by simplifying the bearing structure, the roller cone may be made thicker, thereby allowing for deeper pockets for the cutters 37. Gage inserts 38 are mounted on the gage row of the cone to engage material on the side of the hole and serve the important function of maintaining a constant diameter of the hole.

Mounted on the journal 35 is a frusto-conically shaped bearing 41. This bearing 41 is also illustrated in FIG. 16 and further details of its structure in this second preferred embodiment as well as alternative embodiments are discussed in connection with that figure. At least a portion of the curved outer surface of the journal bearing surface consists of polycrystalline diamond. A mating frusto-conical bearing 42 is mounted within the roller cone 36 which also comprises polycrystalline diamond.

A bolt 43 is threadably attached at its end 44 to the roller cone 36. The bolt 43 will accordingly rotate with the cone 36. In the second preferred embodiment shown here, a locking pin 61 may be inserted through the passage 62 to lock the bolt in place, thereby preventing rotation of the bolt relative to the cone which would otherwise result from friction between the thrust bearing surfaces 45 and 46. The bolt may also be prevented from rotating in the cone 36 using other methods such as welding, application of locking compounds, peening, etc.

In yet another embodiment, the surprising result was discovered that when the journal bearing 41 and roller cone bearing 42 are comprised of PCD, it is possible to allow the bolt to remain unlocked and thereby be self-tightening, without having the bearings bind. In particular, instead of causing the bearings to bind, the self-tightening of the bolt serves the beneficial function of maintaining the bearings in a state of compression against each other while compensating for wear. Accordingly, it may be desirable in the preferred embodiments to permit this self-tightening of the bolt. It is deemed within the ordinary skill in the art to select a pitch for the threads which would avoid placing too much stress on the bolt and maximize the benefits of this self-tightening action.

The bolt 43 extends through a hole 54 in the journal 35 and has a head 47 which is wider than the hole 54. This head 47 is adapted to receive a tool for tightening such as a hex or allen wrench. Adjacent to the head 47 of the bolt 43 is a thrust bearing or washer 46 which mates with a second thrust bearing 45 which is in turn adjacent to the leg 34. Each of these thrust bearings 46 and 45 may either be bonded in their position (i.e. to the head 47 or leg 34 respectively) or may be non-attached. As can be seen, a recess 56 in the leg 34 is adapted to receive the thrust bearings 45 and 46 along with the head 47. It may also be desirable to secure a cover over this recess 56 or fill it with a filler material such as epoxy for protection during drilling. The mating bearing surfaces of the thrust bearings 45 and 46 comprise polycrystalline diamond. Preferably, the PCD surface is comprised of segments rather than a continuous surface. Also, it is preferable to allow the drilling fluid to pass through the hole 54 toward the thrust washers, to thereby cool the thrust washers as well. Also, in this second preferred embodiment, the thrust bearings have a substantially planar interface. In alternative embodiments it may be desirable to shape the head 47 and bearings 45 and 46 to provide a frusto-conical interface between the thrust bearings.

As in the first preferred embodiment, a space 57 is left between the distal end surface 59 of the journal bearing 41 and the internal surface 58 of the roller cone 36. Also, the proximate end surface 60 of the roller cone 36 does not contact the journal 35 or the leg 34. As discussed above, these two features are important because they allow the roller cone bearing 42 to be freely compressed against the journal bearing 41. In other words, in this second preferred embodiment, the frusto-conical journal bearing is the only surface on the journal or leg which prevents the roller cone from moving axially in the direction indicated by arrow B.

It was also discovered that, in using this arrangement, the frusto-conical bearings and the bolt with its thrust washers cooperate to produce at least two important benefits. First, tightening the bolt allows one to put the frusto-conical bearings in precompression. In particular, the bolt is tightened sufficiently to put it in tension and thereby put the journal and roller cones in a state of compression. This state of compression is highly beneficial when the journal and roller cone bearings comprise polycrystalline diamond. It has been observed that PCD, although very strong in compression, is relatively weak in tension. Therefore, if one is to use it in a bearing, particularly in a bearing which will experience high and uneven loads is can be benefited by being pre-loaded with compressive forces in order to minimize the tensile forces the PCD will experience. In other words, the pre-compressed bearing is less likely to exhibit bearing "chatter" which may be deleterious to the PCD structure. This is especially true for this roller cone bit application where during drilling the PCD bearing faces uneven loads from multiple directions.

Secondly, this configuration improves the cone's ability to maintain its original axis of rotation. This is true because of the fact that the combination of the frusto-conical bearings and the thrust bearings presents a triangular cross-section taken through the axis of rotation (i.e. the opposite sides of the roller cone/journal bearing interface and the interface between the thrust bearings make up three sides of a triangle). This means that when force is applied to the roller cone from any direction, there is a part of one of the bearing surfaces to which the force will have a substantial normal component. For example, as the cone experiences increased forces from the side of the hole due to gage wear (in the direction indicated by arrow C in FIG. 14), the thrust bearing interface is compressed and the roller cone bearing does not pinch and is not allowed to lift off of the journal bearing.

In another embodiment, the distal surface 59 of the journal 35 does contact the surface 58 of the cone 36. The dimensions are carefully selected so as to allow the surfaces 58 and 59 to contact yet still allow for sufficient compression between the journal and roller cone bearings. In this embodiment, it is desirable to also include PCD over at least a portion of surfaces 58 and 59. Allowing the two surfaces 58 and 59 to contact would provide protection for the bearing against excessive axial loads encountered during drilling. The same result can also be achieved by allowing the heel surface 60 of the cone 36 to contact the leg 34 of the bit. Providing this "backstop" to protect the journal and roller cone bearings against excessive axial loads may be desirable in bits intended for use in heterogeneous formations or with high loads from the drill string. These embodiments may also be useful in setting the exact amount of pre-load on the bearings as the bolt could be tightened to where the surfaces contact and then backed off.

It should be noted that this other preferred embodiment does not have this "backstop" to protect the journal and roller cone bearing against axial loads. It was surprising to discover that this bearing system with this particular geometry does operate well with extreme axial loads. As discussed in more detail in connection with FIG. 17, it was thought that the large axial loads would cause the frusto-conical bearing to bind if not provided with a separate thrust bearing to absorb these axial loads. To the contrary, it has been found that the high axial loads are beneficial to the bearings operation.

In yet another embodiment, instead of using a bolt to retain the cone 36 on the journal 35, a post is either attached to the cone in the same position or is instead integral with the cone. This post has threads on the end which extend into the recess 56 of the leg 34. A nut is then threaded onto that post with two thrust washers between it and the leg. In yet another embodiment, a hole passes through both the journal and the cone and a bolt with threads on both ends is inserted therethrough. A nut is threaded onto each end and thrust bearings are placed between each nut and the leg or an outer distal surface of the cone. In this embodiment it may be desirable to allow both nuts to self-tighten. This could result in better adjustment of the tension on the bolt through varying stages of wear on the elements of the bit.

FIG. 16 is a perspective view of the frusto-conically shaped journal bearing 41 of this second preferred embodiment. This bearing is shaped to mate with a reverse shaped roller cone bearing (not shown). In the most preferred embodiment, the journal bearing comprises a base member 71 which holds polycrystalline diamond inserts 72 in holes 73. Each insert 72 consists of a layer of polycrystalline diamond 74 bonded to a cemented tungsten carbide back 75. As stated above, it is preferable to include a transition layer, i.e. a layer comprising PCD with precemented carbide pieces dispersed therein, between the PCD bearing surface and the substrate. These carbide-backed inserts 72 are formed by sintering a mass of diamond crystals adjacent to a mass of diamond crystals with relatively small pre-cemented carbided pieces dispersed therein, which mass is in turn adjacent to a pre-cemented carbide piece using ultra high pressure and temperatures.

The height, radius, and slope of the base member 71 are dictated by the various design parameters such as the size and shape of the cone. In particular, the dimensions of the frusto-conical bearings must be selected with the following considerations in mind. The bearing must fit within the cone and allow a sufficient wall thickness for the roller cone. The dimensions of the bearing must also allow for a sufficient thickness of the journal which also has the hole 54 passing through it. Because of the tremendous amount of wear on the gage row of the bit, it is important that the frusto-conical bearings do not extend to the exterior of the bit. That is, the part of the bearing closest to the gage row should be contained within the hole of the cone. In addition, the slope of the bearing also affects the retention of the cone on the journal as it is subjected to the multi-directional forces from the side and bottom of the hole. With a large angle between the bearing surface and the axis of rotation the forces from the side and bottom of the hole will have more of a shear component at the interface of the journal and roller cone bearing than those same forces would have with a smaller angle. For this second preferred embodiment, the angle is 20° between the bearing surface and the axis of rotation.

As with the first preferred embodiment, the second preferred embodiment is also easier to fabricate than the typical prior art roller cone rock bit. Also, if spatial limitations prevent attaching the cones over the journals when the legs are already in place, this second preferred embodiment can be modified slightly. In particular, the journals can be made separate from the legs. In this way, the journals can be inserted into the cones, the cones and journals slid into their position, and then the retaining bolt inserted through the leg into the cones. The journals can be indexed with the leg to insure correct positioning and retention on the leg.

Referring again to FIG. 16, the position, size and number of inserts in each bearing is selected so as to insure that the polycrystalline diamond surfaces support the loads between the roller cone and the journal. As shown, each insert 72 protrudes slightly from the outer surface of the base member 71. In the depicted embodiment, there are three annular rows of inserts on each bearing. On the journal bearing, there are ten inserts in the row closest to the leg, eight inserts in the middle row, and eight inserts in the distal row. On the roller cone bearing, there are nine inserts in each of the three rows. This particular arrangement was selected so as to provide a proper amount of overlapping of the polycrystalline diamond surfaces at any given point of rotation of the cone. In another preferred embodiment, there are two annular rows cf inserts in each bearing, and the angular spacing between inserts is chosen such that there are different numbers of inserts in corresponding rows of the cone and journal bearings so as to provide for smooth operation. One bearing may contain closely-spaced inserts while the inserts in the other bearing may be fairly wide spaced. Naturally, the gap between the inserts on one of the bearings must be smaller than the diameter of the inserts on the other bearing. Alternative embodiments include designs wherein there are either fewer or more inserts as well as more rows.

Both the back 75 and the polycrystalline diamond layer 74 are pre-shaped to conform to the curvature and slope of the outer surface of the journal bearing. The PCD layer 74 is shaped during the ultrahigh pressure/temperature pressing cycle by being sintered adjacent to the carbide back 75 which has previously been correctly shaped. Likewise, the inserts in the roller cone bearing (not shown) are pre-shaped to conform to the curvature and slope of the inside surface of the roller cone bearing. The pre-shaping of the diamond layer to as near the required shape as possible, as opposed to starting with flat or other nonconforming shapes, has been found to be important for three reasons. First, polycrystalline diamond is extremely wear resistant. Accordingly, it would require large amounts of time and effort to grind or cut the polycrystalline diamond to fit the final shape.

Second, because the polycrystalline diamond is a relatively brittle material, it is important that before the polycrystalline inserts are allowed to wear against each other, they present smooth surfaces. In other words, if the polycrystalline diamond pieces experience point to point contact, they would be likely to chip or crack. As a result, it is important to have the polycrystalline diamond pieces conforming to the curvature and slope of the bearing interface before use.

Third, it has been discovered that the final finishing of the polycrystalline diamond surfaces can be accomplished by simply running the two bearings against each other at high speeds and at high loads. See, the co-pending application of David R. Hall Ser. No. 06/747,163 which is directed to this finishing process. The entire disclosure of this application is incorporated herein by reference. This simplification of the finishing process would not be possible if the polycrystalline diamond surfaces were not already close to their final shapes.

In addition to the preferred method of using PCD inserts set into frusto-conical base members, there exist alternative methods of forming PCD bearing surfaces with the frusto-conical shape of the present invention. Theoretically, it may be desirable to produce a bearing for the present invention with a single piece of PCD, with or without a carbide backing, which could be used for the journal or roller cone bearing. However, using present high pressure technology, it is not possible to produce pieces of PCD of a sufficient size.

A possible alternative is to produce several PCD segments or "tiles" which could be fit together to produce continuous surfaces of PCD for the bearings of the invention. These tiles could be used to cover the entire frusto-conical surfaces, or alternatively could be arranged in annular rows or other configurations which would provide sufficient mating PCD surfaces to support the loads between the roller cone and journal while facilitating rotation of the roller cone about the journal.

Another alternative method for forming the PCD bearing surfaces of the present invention is to use PCD in a high concentration matrix. In particular, it is possible to fill a mass of PCD chunks or grit with a suitable metal or the like to produce a unitary piece which possesses properties similar to a piece of solid PCD. One advantage is that this high concentration matrix PCD can be produced in much larger pieces than is possible with solid PCD. Accordingly, a single piece PCD bearing surface could be produced.

Yet another alternative for forming the PCD bearing surface would involve coating a base member with PCD. That is, it is possible to coat a journal bearing base member or a roller cone bearing base member with a layer of PCD through such techniques as flame spraying, electroless plating, etc. In this way, PCD surfaces can be applied to the bearings of the invention.

Although these other alternatives for incorporating the PCD into the journal and roller cone bearings are available, it is noted that the first and second preferred embodiment, i.e., pre-shaped PCD inserts held in frusto-conical bases, has exhibited certain surprising and important advantages. Naturally, in light of its relatively high cost of production, it is economical to use only as much PCD as necessary. It was thought however, that a continuous PCD surface would be required to provide sufficient smoothness for rotation and load carrying capability. Surprisingly, the bearing constructed according to the preferred embodiments has exhibited remarkable smoothness in rotation and load carrying capability. A further advantage of using discrete PCD inserts in the bearing is that it allows for improved cooling and lubrication of the PCD surfaces. With the slight protrusion from the base member, the drilling mud can flow around each insert 72. Also, because the PCD inserts do not present a continuous surface, the drilling mud can pass directly over the bearing surfaces.

FIG. 15 shows an embodiment of the invention which is identical to that depicted in FIG. 14 except that the retaining bolt 93 in FIG. 15 is threaded into the leg 34 as opposed to being threaded into the cone as in FIG. 14. The head 98 of the bolt 93 contacts a thrust bearing 96 which mates with a thrust bearing 97 which contacts the bottom surface of a recess 106 in the roller cone 36. Being so attached, the retaining bolt 93 of this embodiment will not rotate with the cone 36. However, friction between the mating bearing surfaces on the thrust bearings 95 and 96 and the pitch of the threads 94 produce a self-tightening effect as with the embodiment depicted in FIG. 14. Also, as with the embodiment of FIG. 14, it is desirable to maintain the bolt 93 in tension so that the journal bearing 41 and the roller cone bearing 42 are constantly pushed against each other resulting in compression of the bearing surfaces.

In a further alternative embodiment not shown, the retaining bolt is made with threads on both ends. A pair of thrust bearings and a nut are fitted on both ends. These thrust bearings could be planar as shown in FIG. 14 and 15, frusto-conical, or other shapes which would produce the best result. The direction and pitch of each set of threads is selected so as to provide self-tightening on both ends. This embodiment may be desirable to reduce stress to the retaining bolt.

Although the discussion of the embodiments which include pre-compression means has dealt only with threaded bolts to retain the roller cone on the journal and to maintain compression between the roller cone and journal bearing surfaces, other embodiments are possible. For example, pins which are welded and/or heat shrunk into place may be used to serve the same two functions. In addition, although the roller cones depicted all use cutting inserts to engage the material, it should be understood that the bearing system of the present invention is likewise suitable for other types of roller cones such as those which use steel teeth or annular ridges to engage and disintegrate material. Certainly, these and other modifications which are within the ordinary skill in the art to make are considered to lie within the scope of the invention as defined by the following claims.

We claim:

1. A roller cone rock bit comprising:
   a main bit body with at least one downwardly extending leg, said leg having a journal thereon, said journal having a frusto-conically shaped main journal bearing surface which comprises polycrystalline diamond;
   a roller cone rotatively mounted on each journal, said roller cone having a main roller cone bearing surface which mates with the main journal bearing surface and which comprises polycrystalline diamond; and
   means for maintaining the two bearing surfaces in a state of compression against each other.

2. A roller cone rock bit as in claim 1, wherein said compression means comprises a pin which rotates within the journal, said pin having a first end attached to the roller cone, and a second end including a bearing which mates with a bearing on the leg.

3. A roller cone rock bit as in claim 2, wherein the first end of the pin is threadably attached within the roller cone.

4. A roller cone rock bit as in claim 3 wherein the bearing of the second end of the pin comprises a first thrust washer with a bearing surface, and the bearing on the leg comprises a second thrust washer with a bearing surface, said first and second thrust washer bearing surfaces mating and being maintained in compression against each other.

5. A roller cone rock bit as in claim 1, wherein said retaining means comprises a pin about which the roller cone rotates, and has a first end attached to the journal, and a second end including a bearing which mates with a second bearing surface on the roller cone.

6. A roller cone rock bit as in claim 5, wherein the first end of the pin is threadably attached within the journal.

7. A roller cone rock bit as in claim 6 wherein the bearing of the second end of the pin comprises a first thrust washer with a bearing surface, and the second bearing on the roller cone comprises a second thrust washer with a bearing surface, said first and second thrust washer bearing surfaces mating and being maintained in compression against each other.

8. A roller cone rock bit as in claim 1 further comprising means for passing a stream of drilling fluid over the journal and roller cone bearing surfaces.

9. A roller cone rock bit as in claim 8 wherein the means for passing a stream of drilling fluid over the journal and roller cone bearing surfaces comprises a passage through the bit which communicates at one end with a source of drilling fluid from a drill string and communicates at another end with said journal and roller cone bearings, and an exit passage.

10. The roller cone rock bit of claim 1 wherein the main journal bearing surface comprises a plurality of inserts each having a bearing surface comprised of polycrystalline diamond and wherein each insert is set into holes formed in the journal.

11. The roller cone rock bit of claim 1 wherein the main roller cone bearing surface comprises a plurality of inserts each having a bearing surface comprised of polycrystalline diamond and wherein each insert is set into holes formed in the roller cone.

12. The roller cone rock bit of claim 1 wherein the main roller cone bearing surface comprises a plurality of inserts each having a bearing surface comprised of polycrystalline diamond and wherein each insert is held in place by a frusto-conically shaped shell with holes to receive said inserts.

13. A roller cone rock bit comprising:
   a main bit body with at least one downwardly extending leg, each leg having a journal thereon, said journal having a journal bearing with a substantially frusto-conically bearing surface comprising polycrystalline diamond;
   a roller cone rotatably mounted on the journal, the roller cone having a roller cone bearing with a surface comprised of polycrystalline diamond which mates with the substantially frusto-conically shaped bearing surface of the journal bearing;
   said journal defining a hole which includes the axis of rotation of the roller cone;
   a bolt which passes &through said hole in the journal and has a first end which is threadably attached to the roller cone, and has a second enlarged end positioned outside of said hole;
   a first thrust bearing which is adjacent to said enlarged end and through which said bolt passes said first thrust bearing having a first thrust bearing surface;
   a second thrust bearing which is adjacent to said leg and through which said bolt passes, said second thrust bearing having a second thrust bearing surface which mates with said first thrust bearing surface; and
   said bolt being maintained in tension so as to place said journal bearing and roller cone bearing in compression against each other, and to place said first and second thrust bearing surfaces in compression against each other.

14. A roller cone rock but comprising:
   a main bit body with at least one downwardly extending leg, each leg having a journal thereon, said journal having a journal bearing with a substantially frusto-conically shaped bearing surface comprising polycrystalline diamond;

a roller cone rotatably mounted on the journal, the roller cone having a roller cone bearing with a bearing surface comprised of polycrystalline diamond which mates with the substantially frusto-conically shaped bearing surface of the journal bearing, said roller cone defining a hole which includes the axis of rotation of the roller cone;

a bolt which passes through said hole in the roller cone and has a first end which is threadably attached to the journal, and has a second enlarged end positioned outside of said hold;

a first thrust bearing which is adjacent to said enlarged end and through which said bolt passes said first thrust bearing having a first thrust bearing surface;

a second thrust bearing which is adjacent to said roller cone and through which said bolt passes, said second thrust bearing having a second thrust bearing surface which mates with said first thrust bearing surface; and said bolt being maintained in tension so as to place said journal bearing and roller cone bearing in compression against each other, and to place said first and second thrust bearing surfaces in compression against each other.

15. A roller cone rock bit comprising:

a main bit body with at least one downwardly extending leg, each leg having a journal thereon, said journal having a journal bearing with a substantially frusto-conically shaped bearing surface comprising polycrystalline diamond;

a roller cone rotatably mounted on the journal, the roller cone having a roller cone bearing with a bearing surface comprised of polycrystalline diamond which mates with the substantially frusto-conically shaped bearing surface of the journal bearing, said roller cone defining a hole which includes the axis of rotation of the roller cone;

said journal defining a hole which includes the axis of rotation of the roller cone;

a bolt which passes through said hole in the journal and said hole in the roller cone, said bolt having a first end with a first nut threaded thereon and a second end with a second nut threaded thereon;

a first set of thrust bearings through which the first end of the bolt passes and which are positioned between said first nut and the leg;

a second set of thrust bearings through which the second end of the bolt passes and which are positioned between the second nut and the roller cone; and said first and second nuts being sufficiently tightened to place said bolt in tension, thereby placing said journal bearing and roller cone bearing in compression against each other 16. A roller cone rock bit as in claim 13, 14, or 15 wherein said bolt is self-tightening during drilling.

17. A roller cone rock b&t as in claims 13, 14, or 15 further comprising means for passing a stream of drilling fluid over the journal and roller cone bearing surfaces.

18. A roller cone rock bit as in claims 1, 4, 7, 13, 14, or 15 wherein said frusto-conical journal bearing is comprised of a base member with a frustoconically shaped outer surface and a plurality of polycrystalline diamond inserts which are held in place by said base member.

19. A roller cone rock b]t as in claim 18, wherein said polycrystalline diamond inserts comprise a polycrystalline diamond portion directly bonded to a backing of a cemented carbide.

20. A roller cone rock bit as in claim 18, wherein said polycrystalline diamond inserts are molded to a shape substantially conforming to the slope and curvature of the frusto-conically shaped journal bearing.

* * * * *

UNITED STATES PATENT AND TRADEMARK OFFICE
CERTIFICATE OF CORRECTION

PATENT NO. : 4,802,539
DATED : February 7, 1989
INVENTOR(S) : David R. Hall

It is certified that error appears in the above-identified patent and that said Letters Patent is hereby corrected as shown below:

ON THE TITLE PAGE,
UNDER INVENTORS

In column 1, lines 3 and 4, please delete "Donald G. Cross, Laguna Beach, Calif."

IN THE BACKGROUND OF THE INVENTION

In column 2, line 57, please delete "compactss" and substitute therefore --compacts--.

IN THE SUMMARY OF THE INVENTION

In column 3, line 60, please delete "embodiment" and substitute therefor --embodiments--.

IN THE BRIEF DESCRIPTION OF THE DRAWINGS

In column 4, line 12, please insert after "FIG. 1" --is a--.

In column 4, line 46, please delete "FIGS." and substitute therefor --FIG.--.

UNITED STATES PATENT AND TRADEMARK OFFICE
CERTIFICATE OF CORRECTION

PATENT NO. : 4,802,539
DATED : February 7, 1989
INVENTOR(S) : David R. Hall

It is certified that error appears in the above-identified patent and that said Letters Patent is hereby corrected as shown below:

<u>IN THE DETAILED DESCRIPTION</u>

In column 7, line 44, please delete "in" and substitute therefor --an--.

In column 7, line 62, please delete "Journal" and substitute therefor --journal--.

In column 8, line 62, please delete "hole" and substitute therefor --holes--.

In column 11, line 6, please delete the first "the".

In column 11, line 53, please move "(1)" to the left margin.

In column 11, line 55, please move "(2)" to the left margin.

In column 13, line 37, please insert after the second "percent" --precemented carbide pieces and is about 0.015 inches--.

In column 15, line 14, please delete "is" and substitute therefor -- , it --.

UNITED STATES PATENT AND TRADEMARK OFFICE
CERTIFICATE OF CORRECTION

PATENT NO. : 4,802,539

DATED : February 7, 1989

INVENTOR(S) : David R. Hall

It is certified that error appears in the above-identified patent and that said Letters Patent is hereby corrected as shown below:

In column 15, line 68, please delete "bearings" and substitute therefor --bearings'--.

In column 16, lines 28 and 29, please delete "substrate," and substitute therefor --substrate. --

In column 17, line 60, please delete "Hall" and substitute therefor --Hall,--.

In column 19, line 6, please delete "FIG." and substitute therefor --FIGS.--.

In column 20, line 45, please delete "&".

In column 20, line 63, please delete "but" and substitute therefor --bit--.

In column 21, line 11, please delete "hold;" and substitute therefor --hole;--.

In column 22, line 17, please delete "other" and substitute therefor --other.--.

In column 22, line 20, please delete "b&t" and substitute therefor --bit--.

UNITED STATES PATENT AND TRADEMARK OFFICE
CERTIFICATE OF CORRECTION

PATENT NO. : 4,802,539
DATED : February 7, 1989
INVENTOR(S) : David R. Hall

Page 4 of 4

It is certified that error appears in the above-identified patent and that said Letters Patent is hereby corrected as shown below:

In column 22, line 26, please delete "frustoconically" and substitute therefor --frusto-conically--.

In column 22, line 27, please delete "surface" and substitute therefor --surface,--.

In column 22, line 30, please delete "b]t" and substitute therefor --bit--.

Signed and Sealed this

Fourth Day of July, 1989

Attest:

DONALD J. QUIGG

*Attesting Officer*    *Commissioner of Patents and Trademarks*